United States Patent

[11] 3,556,507

[72] Inventors Frederick Bailey Haskell
 24633 N. Newhall Ave.;
 Samuel K. Haskell, 23360 Haskell Vista
 Lane, Newhall, Calif. 91321
[21] Appl. No. 721,025
[22] Filed Apr. 12, 1968
[45] Patented Jan. 19, 1971

[54] FISH HOLDING APPARATUS
 3 Claims, 5 Drawing Figs.
[52] U.S. Cl. ..................................................... 269/98,
 269/101, 269/254, 269/287, 17/70, 43/4, 43/53.5,
 24/129, 24/255, 24/263
[51] Int. Cl. ..................................................... B23q 3/02,
 B23q 3/08
[50] Field of Search........................................... 43/53.5,
 21.2; 17/8; 269/254, 131, 98, 102, 101, 287;
 24/30.5(RS), 255(BB), 255(G), 255(R), 255(T),
 259.2, 263(SB), 129(B)

[56] References Cited
 UNITED STATES PATENTS

| | | | |
|---|---|---|---|
| 917,306 | 4/1909 | Johnston | 269/102X |
| 1,660,329 | 2/1928 | Fleming | 269/98 |
| 1,782,615 | 11/1930 | Hopwood | 269/98 |
| 2,207,892 | 7/1940 | Mullaney | 24/263X |
| 614,387 | 11/1898 | Hargis | (17/70UX) |
| 1,772,885 | 8/1930 | Case | 269/254X |
| 2,430,112 | 11/1947 | Hamre | 248/42 |
| 2,757,951 | 8/1956 | Benton | (17/70UX) |
| 3,181,198 | 5/1965 | Stelzen | 17/70 |

*Primary Examiner*—Samuel Koren
*Assistant Examiner*—Daniel J. Leach
*Attorney*—Daniel T. Anderson

ABSTRACT: A spring-biased clamp for grasping the midbody of a hooked fish in a compressive manner both to secure the live fish and to urge its mouth open for purposes of removing the hook therefrom. The clamp apparatus includes means for affixing it to the gunwale or other structure of a boat.

PATENTED JAN 19 1971 3,556,507

FREDERICK BAILEY HASKELL
SAMUEL K. HASKELL
INVENTORS

BY Daniel T. Anderson
ATTORNEY

FISH HOLDING APPARATUS

BACKGROUND OF THE INVENTION

1. Field of the Invention

The present invention relates generally to fishing apparatus and more particularly to a holding means and a method for grasping and controlling a newly landed fish.

Although the invention finds particularly useful application in the field of devices for small boat sport fishing for lake and stream types of fish and although, in the cause of brevity and clarity of presentation, much of the following discussion and description of examples are directed theretoward, it is expressly to be understood that the advantages of the invention are equally well manifest in other fields and in other modes of fishing; such as, for example, with large boats or from bridges or wharves or in ocean or commercial fishing.

2. Discussion of the Prior Art

The hard work and difficulties and disappointments of removing a well-set hook from the mouth of a live and struggling fish are probably as well known as the joys and satisfactions of the catch. The fish is more or less difficult to hold depending upon the youth of the fisherman and the size of his catch; however, it requires at least one hand, and often two, leaving, at most, one hand for holding the fish's mouth open and working the hook free. Furthermore, the task may be dangerous or at least painful when the fish has teeth, is a poison spine sculpin, or is a catfish or the like. Other unfortunate consequences of prior art fish-holding methods include deleteriously bruising the meat of the fish, losing the fish back to the water, and losing the hook and leader as an alternative to suffering the difficulties of removing the hook. The latter is particularly disappointing when the "fish" is an undesirable or illegal catch and is not to be kept.

Some prior art attempts to provide a satisfactory solution to the problem have typically been directed toward developing a fish vise which in some cases is helpful in some respects but which suffers the disadvantages of being bulky, structually or functionally complex, costly, difficult to maintain and clean, or which causes the deleterious piercing or bruising of the body of the fish.

Accordingly, it is an object of the invention to provide fish-holding apparatus which is not subject to these and other disadvantages and limitations of the prior art.

It is another object to provide such apparatus which is structurally simple, rugged, reliable, and inexpensive to manufacture.

It is another object to provide such apparatus which is exceedingly easy, quick, and simple to operate even by a child, and which is easily maintained and cleaned.

It is another object to provide such apparatus which securely holds the live fish quiet with its head up and its mouth open.

It is another object to provide such apparatus which does not bruise or pierce the body of the fish.

It is another object to provide such apparatus which may be readily removably attachable to a portion of a boat or other environmental structure.

SUMMARY OF INVENTION

Very briefly, the foregoing objects are achieved in accordance with the structural aspects of an example of the invention which includes a clamp having a stationary jaw portion with means for affixing to environmental structure, and a movable juxtaposed portion force biased toward the stationary jaw portion by spring means. Handle means are carried by the movable jaw portion for pulling it against the spring means, away from the stationary jaw portion. The juxtaposed surfaces of the two jaw portions are provided with gripping means which engage the flat, side body portions of the fish and which, in cooperation with the spring compressive forces, securely hold the fish. The compressive forces are widely distributed and are consequently relatively gentle and nondamaging; importantly, however, the compressive forces thusly applied to the sides of the fish body tend inherently to force and hold widely open the mouth of the fish as an exceedingly useful aid in removing the hook therefrom.

Further details of these and other novel features and their operation as well as additional objects and advantages of this and alternative forms of the invention will become apparent and be best understood from consideration of the description below when taken in connection with the accompanying drawing which is presented by way of illustrative example only.

DESCRIPTION OF PREFERRED EMBODIMENTS

Figure 1:
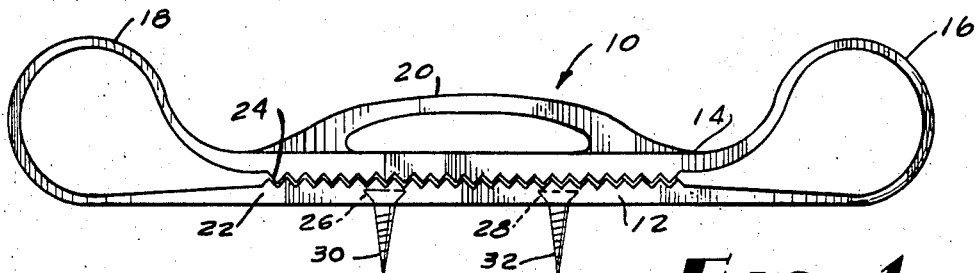
FIG. 1 is a plan view of an example of a fish-holding apparatus constructed in accordance with the principles of the present invention.

With specific reference now to the FIGS. in detail, it is stressed that the particulars shown are by way of example only and for purposes of illustrative discussion only, and are presented in the cause of providing what is believed to be the most useful and readily understood description of the principles and structural concepts of the invention. In this regard no attempt is made to show structural details of the apparatus in more detail than necessary for a fundamental understanding of the invention. The description taken with the drawing will make it apparent to those skilled in the mechanical and sporting goods arts how several forms of the invention may be embodied in practice. Specifically, the detailed showing is not to be taken as a limitation upon the scope of the invention.

In FIG. 1, the example of the invention illustrated comprises an integral mold-fabricated holding body 10. The apparatus may be molded of a relatively high impact strength plastic material which is elastically bendable, nonporous, and relatively rigid with respect to deforming forces. The body 10 includes a stationary fish body-gripping plate portion 12 and a juxtaposed movable, fish body-gripping plate portion 14. The two juxtaposed plate portions 12, 14 are interconnected by symmetrically disposed end portions 16, 18 having tapered reduced thickness, as indicated, for bending without undue concentrations of strains.

The interconnecting end portions 16, 18 provide a normally directed, compressive gripping force on the movable plate portion 14 with respect to the stationary portion 12. Work against these spring forces may be done by one's hand grasping a molded handle portion 20 resulting in a fish body-receiving disposition of the plate members as illustrated in FIG. 2.

Also integrally molded in the body 10 may be friction-providing fish-gripping surfaces 22, 24 disposed on the inwardly directed surfaces of the plate portions 12, 14, respectively. Additionally, the stationary plate portion 12 may be bored and countersunk as at 26, 28 to receive mounting screws 30, 32 which may be selected to be of the character for fastening the assembly to the gunwale or other stable environmental structure, not shown, desirably located for the indicated dehooking operations.

Figure 2:
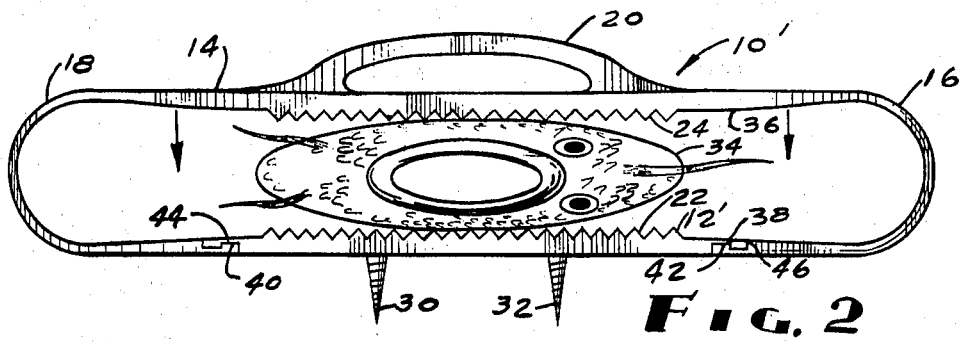
FIG. 2 is a like view thereof illustrating additional aspects of its structure and operation.

Referring to FIG. 2, the structure of FIG. 1 is repeated, in most essential respects, except that, as indicated earlier, the movable plate portion 14 is shown displaced away, in the normal direction, from the stationary plate portion 12 to provide space therebetween to receive, securely, a fish as indicated at 34.

An additional aspect in which the structure of FIG. 2 differs from that of FIG. 1 is that the body 10', in this example, is shown as molded in two interfitting members 36, 38. This form of the invention is functionally equivalent to that of the earlier figure but is, for some manufacturing facilities, more readily moldable; and, advantageously, the body may be disassembled for cleaning or other purposes when desired and without removing the stationary plate portion 12' from its securement to the environmental structure. The two portions 36, 38 of the molded body 10' are vertically slidingly interlockingly engageable by cooperative operation of undercut and keyed ends 40, 42 of the stationary plate portion 12' (member 38) and the matingly formed ends 44, 46 of the member 36.

Figure 3:
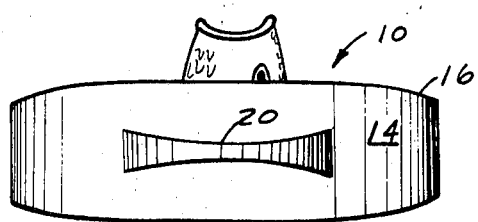
FIG. 3 is a frontal elevational view of the structure shown in FIG. 2.

Referring to FIG. 3, the structure illustrated in plan in FIG. 2 is shown in frontal elevation. In this view, an example of the molded handle member 20 and the contoured end portions 16, 18 are presented in considerable clarity. Also illustrated in FIG. 3 is the result of compressively gripping a typical fish just aft of its head portion, as shown: the fish not only is held securely near the point of the dehooking operation, but, unobviously, the mouth of the fish is urged widely open, thusly greatly facilitating the operation.

Figure 4:
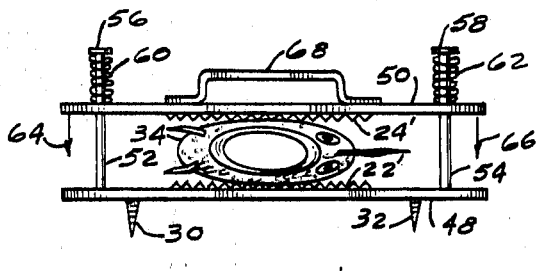
FIG. 4 is a plan view of an alternative example of the invention.

In FIG. 4, an alternative form of the invention is illustrated in which the stationary plate member 48 and the movable plate member 50 may be formed separately of wood, plastic, or metal. Frictional, gripping means 22', 24' may again be provided on the inwardly directed surfaces of the fish body-gripping plate members as indicated.

A pair of alignment and holding post members 52, 54 are rigidly affixed to the stationary plate member 48 and extend perpendicularly therefrom through alignment apertures in the movable plate member 50. The outer end of each of the post members 52, 54 is provided with a retaining, stop element 56, 58, a pair of compression spring members 60, 62 are disposed on the post members between the outer surface of the movable plate and the stop elements for urging the movable plate member 50 toward the stationary plate member 48 in a fish body 34 gripping relation as indicated by the force arrows 64, 66. Again, a handle member 68 may be affixed to the outer surface of the movable plate member 50 for operation of the assembly.

Figure 5:
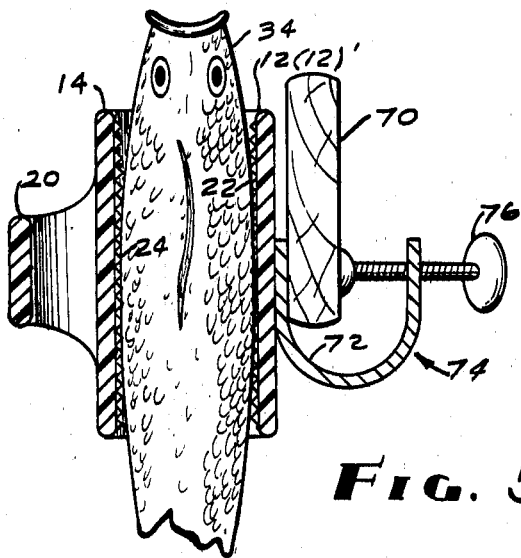
FIG. 5 is a side elevational view of an additional example of the invention.

Referring to FIG. 5, the apparatus illustrated in FIG. 1 or FIG. 2 is shown in a vertical cross section in combination with alternative means for affixing the apparatus to environmental structure such as a gunwale member 70. In this example of the invention, the stationary plate member 12 or 12' is shown rigidly affixed to the body 72 of a c-clamp assembly 74 which, in turn, encircles a portion of the gunwale member 70 so that the finger-actuated securing screw 76 may be compressively tightened against the environmental structure as indicated.

Again, as in the previous figures, a typical fish body 34 is shown compressively gripped between the movable plate member 14 and the stationary gripping plate member 12 (12'). Also shown in the view of FIG. 5 are the handle member 20 and the "knurled" or otherwise friction providing surfaces 22, 24 on the inwardly directed portions of the plate members.

In practice, the fish may be dangled with one hand, between the plates or jaws held open with the handle member 20 by the other hand. When the fish body is emplaced approximately as shown, with the sides thereof juxtaposed against the sides of the gripping plate members, the handle member 20 is released; and the fish is thereafter securely held, mouth open for the hook-extraction process. The fish may then be stored for further processing or, if undesirable or undersize, may be returned to the water with minimum injury from the hook extraction and other handling suffered by the fish.

There have thus been disclosed and described the structural aspects of a number of examples of a fish-holding device exhibiting the advantages and achieving the objects set forth hereinabove.

We claim:

1. Fish-holding apparatus comprising:
   stationary fish body-gripping plate means having securing means carried thereby for removably affixing it supportingly to environmental structure;
   movable fish body-gripping plate means disposed in a juxtaposed approximately parallel relation with respect to said stationary plate means;
   compressive gripping force-providing means interconnecting said movable plate means to said stationary plate means and including spring means urging the two plate means toward each other cooperatingly in a fish body-gripping relationship;
   frictional gripping surface means disposed inwardly over at least a portion of each of the juxtaposed surfaces of said movable and stationary fish body-gripping plate means;
   handle means carried outwardly by said movable plate means of the character to be grasped by hand for pulling said movable plate means away from said stationary plate means against the bias of said spring means;
   said movable and stationary-gripping plate means and said compressive gripping force-providing means, including said spring means, being integrally mold fabricated of an elastically bendable, high-impact strength plastic material.

2. The invention according to claim 1 in which said movable and stationary plate means are formed with a thickness such as to be relatively nondeforming, and said compressive gripping force-providing means is formed with a tapered reduced thickness thereby to be relatively elastically deformable.

3. The invention according to claim 1 in which said frictional gripping surface means and said handle means are also mold fabricated internally with said plate means and said gripping force-providing means.